United States Patent Office 3,690,826
Patented Sept. 12, 1972

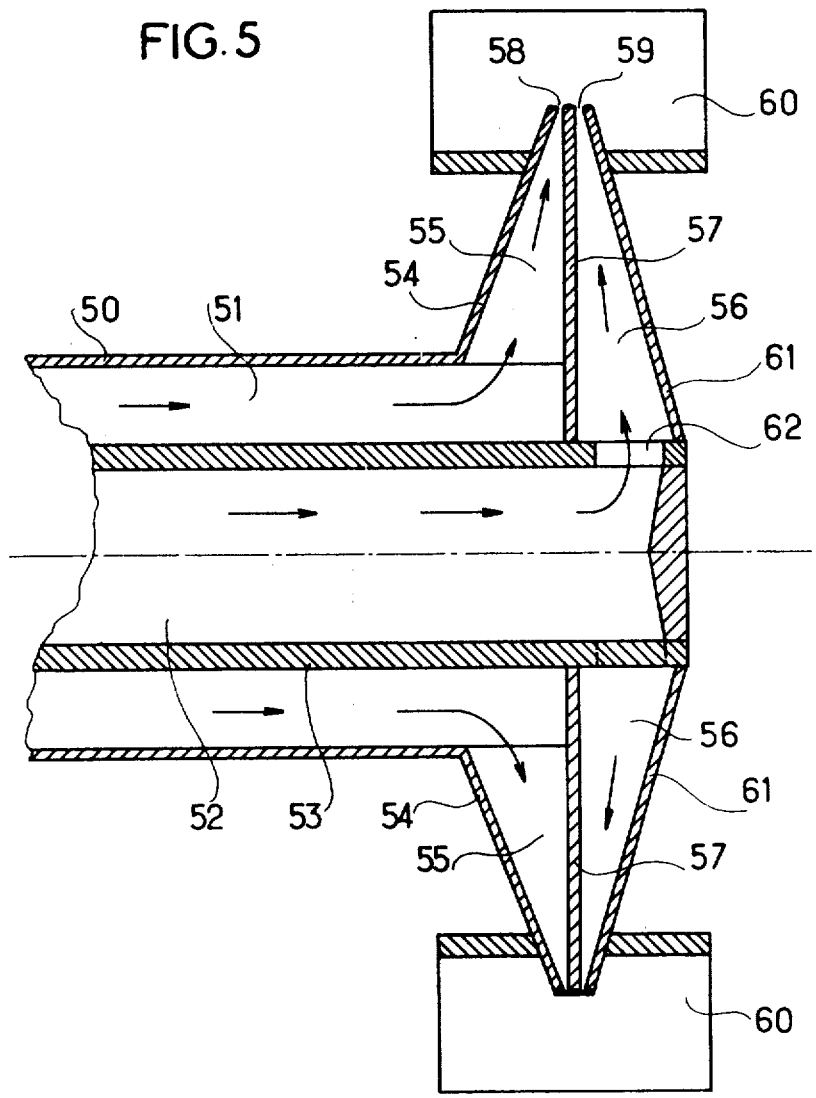

3,690,826
PROCESS FOR THE PRODUCTION OF PHOSPHORIC ACID BY THE WET METHOD
Albert Leon Lucien Husken, 17 Rue de la Liberte, Bondy, Seine-Saint Denis, France
Continuation-in-part of application Ser. No. 524,240, Feb. 1, 1966. This application Dec. 23, 1969, Ser. No. 887,764
Claims priority, application France, Feb. 2, 1965, 4,160; Sept. 3, 1965, 30,372
Int. Cl. C01f 11/46; C01b 25/22
U.S. Cl. 423—320        6 Claims

ABSTRACT OF THE DISCLOSURE

The invention relates to a process for the production of phosphoric acid by the wet method in which crushed natural phosphate and concentrated sulfuric acid are added to a phosphoric acid slurry circulating in a closed circuit. A predetermined end product can be obtained by controlling the temperature and rate of flow of the ripening slurry through the circuit.

---

This application is a continuation-in-part of Ser. No. 524,240, filed Feb. 1, 1966, and now abandoned.

The present invention relates to a wet method process for the production of phosphoric acid, starting with phosphate and sulfuric acid.

The existing processes for the production of phosphoric acid by the wet method are based on the same principle, which is: a circuit of phosphoric acid slurry (composed of 60 to 70% by weight of phosphoric acid with 30 to 32% of $P_2O_5$ and 2.5% of $H_2SO_4$ and 30 to 40% by weight of gypsum) is successively subjected to the following actions, but in a variable order:

(1) Introduction of phosphate crushed to a greater or lesser degree into the circuit. This introduction is carried out in one of the tanks or tank fraction comprising the circuit. The basic reactions are as follows:

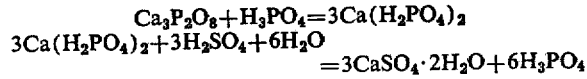

The main secondary reactions are:

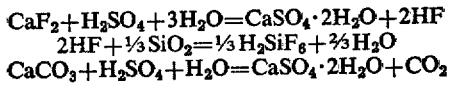

(2) Introduction of more or less highly concentrated sulfuric acid into the circuit. The sulfuric acid is generally mixed with the washing waters from the filtration of the slurry at the moment of its introduction into the slurry circuit. The introduction of sulfuic acid makes it possible to maintain the sulfuric acid excess in solution in the phosphoric acid, of which the sulfuric acid content is constantly reduced by the reactions set out under 1.

(3) The reactions of the phosphate and sulfuric acid release a considerable quantity of heat, which must be eliminated in order to maintain operations at the correct temperature. Elimination of the heat can be accomplished either by boiling the slurry in vacuo, or by cooling the circulation by blowing in air.

(4) The slurry produced by 1, 2, and 3 is withdrawn. The slurry remaining in circulation recommences a fresh cycle.

The slurry produced is directed into one or more "ripening" vats for finishing operations including the completion of reaction and bringing the phosphoric acid into solubility equilibrium wth the gypsum.

After ripening, the slurry goes to a vacuum filter for separation of the phosphoric acid from the gypsum. The last fractions of acid wetting the gypsum crystals are eliminated by washing with water in counter-current. The vacuum filters are washed two or three times.

The filtration operation is frequently the bottleneck in this manufacturing process. The suitability of the gypsum crystals for filtration varies considerably with their shapes and their dimensions.

By definition, a good process for the production of phosphoric acid is one which permits the production of readily filterable gypsum crystals while making it possible to obtain an extraction yield of 95% of $P_2O_5$ and a production of phosphoric acid with a concentration of 30 to 32% of $P_2O_5$.

The capacity for filtration of the gypsum crystals is a function of the regularity and dimensions of the crystals.

The basic difficulty in the production of large and regular gypsum crystals is the low solubility of the calcium sulfate in the phosphoric acid. The dimensions reached in the best cases are between 100 and 300$\mu$.

The solubility curves of the gypsum and of the semi-hydrate (FIG. 1) in phosphoric acid demonstrate the importance of this factor and the difficulties which result therefrom. Furthermore, it is largely for this reason that the hourly rate of flow of the slurry is 10 to 20 times higher than the hourly quantity of slurry produced, so as to partially compensate for the low solubility of the calcium sulfate.

The present invention proposes providing various improvements in the aforementioned process for the production of phosphoric acid, so that the calcium sulfate is in a crystalline state at the end of the reaction, thereby facilitating the separation.

Thus, the present invention provides a process for a wet method preparation of phosphoric acid in which the acid is extracted from portions withdrawn, after ripening, from phosphoric acid slurry circulating in a closed circuit and to which is added natural crushed phosphate and sulfuric acid, characterized in that means are employed for dispersing the sulfuric acid at high speed in the slurry by centrifuging through substantially horizontal thin slots, the sulfuric acid issuing from the slots in the form of a thin lamina, said means also being operative to agitate the slurry.

The invention also provides a regulation of the physico-chemical conditions (temperature, hourly rate of flow in the past circulation etc.) of the reaction, so as to cause the formation either of gypsum ($CaSO_4 \cdot 2H_2O$), $\alpha$-semi-hydrate ($CaSO_4 \cdot \frac{1}{2}H_2O$), or anhydrite ($CaSO_4$).

Another object of the invention is to obtain the formation of a microscopic precipitate (probably of the unstable $\beta$-semi-hydrate) by regulating to above 70° C. the temperature which is reached by the paste immediately after the dispersion of the sulfuric acid, and then, by lowering this temperature to a level of about 70° C. at the outlet of the dispersion apparatus, to transform quickly this gypsum precipitate by enlargement of the already existing gypsum crystals up to a size of 800 to 1000$\mu$ and larger.

The invention also provides an installation for production of phosphoric acid when used for carrying out the process as hereinbefore defined.

The process and the installations effective according to the invention will hereinafter be described by reference to the accompanying drawing, wherein:

FIG. 5 is a sectional view of the lower part of a combined agitating and dispersing means for the sulfuric acid, which can be used in the installation according to FIG. 4.

The different working phases according to the invention are as follows:

The introduction into the slurry of crushed natural phosphate leads in known manner to the basic reaction:

$$Ca_3P_2O_8 + 4H_3PO_4 = 3[Ca(H_2PO_4)_2]$$

of which a part reacts with the excess of sulfuric acid in solution in the phosphoric acid of the slurry in order to give the reaction:

$$3[Ca(H_2PO_4)_2] + 3H_2SO_4 + 6H_2O = 3CaSO_4 \cdot 2H_2O + 6H_3PO_4$$

This introduction of the natural phosphate into the slurry can immediately precede or immediately follow the introduction of sulfuric acid. The method of procedure depends on the greater or lesser reactivity of the phosphate with the slurry and thus depends on the nature of the phosphate and the degree of fineness used in the crushing.

By a good dispersion of the sulfuric acid, there is practically avoided the massive formation of undesired crystal nuclei and microprecipitates. The limited formation of crystal nuclei and microcrystals guarantees that a regular crystallization of good dimensions is obtained.

The physicochemical conditions of the entire process according to the invention can be regulated so as to ensure the eventual formation of a phosphoric acid slurry and of crystals, consisting either of gypsum, or of α-semi-hydrate, or of anhydrite.

The following description sets out specifically, but does not limit, the details of the process in the case of the formation of phosphoric acid slurry with gypsum crystals. This description applies to the formation of phosphoric acid slurry with crystals of α-semi-hydrate or of anhydrite.

The sulfuric acid immediately after disperson gives the following summary reaction with the monocalcium phosphate:

$$Ca(H_2PO_4)_2 + H_2SO_4 + xH_2O = CaSO_4 \cdot xH_2O + 2H_3PO_4$$

Figure 1:
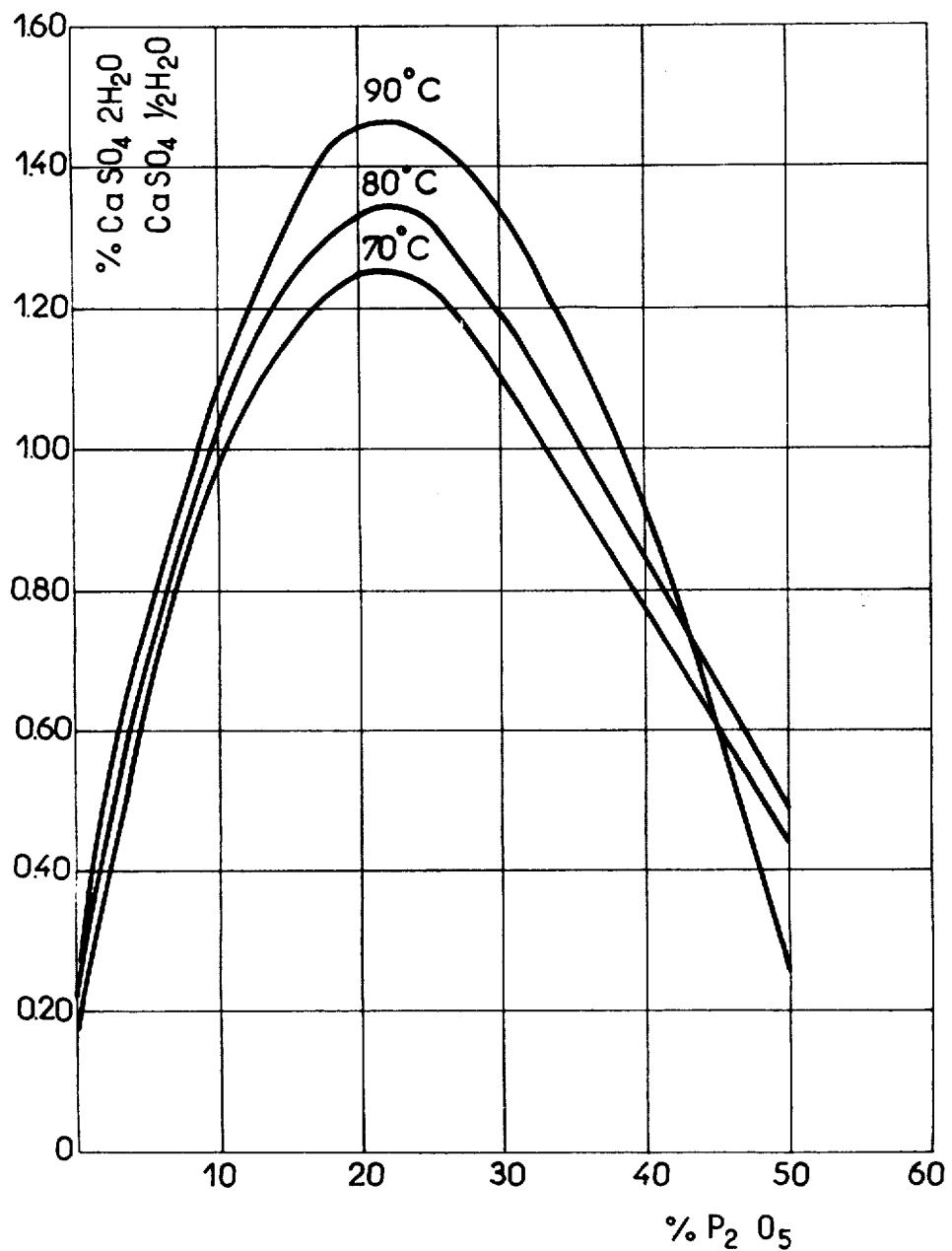
FIG. 1 is a diagram showing the solubility curves of the gypsum and of the calcium sulfate semi-hydrate in the phosphoric acid as a function of the concentration of the phosphoric acid.
Figure 2:
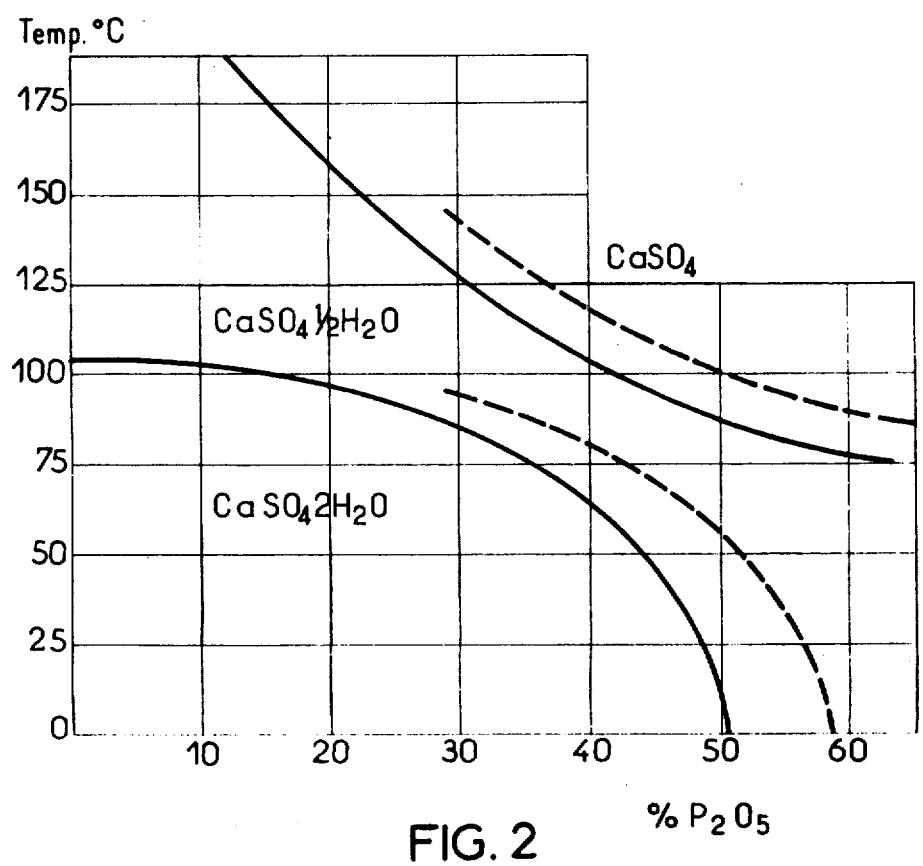
FIG. 2 is a diagram showing the equilibrium curves of the gypsum, the semi-hydrate, and the anhydrite as a function of the temperature and the concentration of the phosphoric acid.

The value of $x$ in the formula $CaSO_4 \cdot xH_2O$ varies between ½ and 2 as a function of the temperature resulting immediately after the dispersion of the concentrated sulfuric acid in the slurry. The coefficient $x$ approaches 2 for the lower temperatures. This coefficient descends progressively towards ½ as the temperature of the paste containing the dispersed sulfuric acid rises towards the limiting temperature between the stability zone of the semi-hydrate and the gypsum zone under the operational conditions which are applied (see FIG. 2, in which the curves in full lines have been established by Lehrecke and those in broken lines by Sanfourche).

In other words, a part of the calcium sulfate produced by the action of sulfuric acid on the slurry enters into solution in the phosphoric acid of the slurry and then contributes to the enlargement of the already existing crystals. The other part of the calcium sulfate produced leads to the formation of a mixture of nuclei and gypsum crystals and a microscopic precipitate (dimensions below 1 micron), which is probably β-semi-hydrate.

The proportion of gypsum and of β-semi-hydrate in the precipitate obtained by the introduction of sulfuric acid into the slurry is a function of the physicochemical conditions (mixing temperature, $P_2O_5$ concentration in the phosphoric acid, $H_2SO_4$ concentration in the phosphoric acid, nature of the phosphate, etc.).

The above phenomenon can be given an equation in the following manner:

If $Q_{phosphate}$ designates the hourly heat of reaction released by the phosphate on the slurry, $Q_{loss}$ represents the heat lost hourly by all the reactions, $P_{circuit}$ represents hourly weight of circulation of phosphoric acid slurry, $Cs_{circuit}$ represents specific heat of the circulating slurry, $T_{output}$ represents boundary temperature between the gypsum and the semi-hydrate, 70° C. represents temperature of the phosphoric acid slurry the physicochemical condition necessary to ensure that $x$ tends towards ½ in the $CaSO_4 \cdot xH_2O$ precipitate, that is to say, to obtain the maximum proportion of (supposed) β-semi-hydrate, is:

(A) $Q_{phosphate} + Q_{H_2SO_4} - Q_{loss}$
$= P_{circuit} \times Cs_{circuit} \times (T_{output} - 70° C.)$ It will be seen above that the maximum proportion of supposed β-semi-hydrate in the precipitate obtained by the dispersion of the sulfuric acid in the slurry permits a maximum enlargement of the gypsum crystals of the slurry to be obtained.

The Equation A shows that, all other conditions being the same, the $T_{output}$ temperature is directly related to the hourly weight of the circuit. If the latter is increased, the temperature obtained at the outlet of the device for dispersing sulfuric acid in the circuit decreases, and the proportion of supposed β-semi-hydrate precipitate also decreases, this decrease being greater as the temperature obtained is lower.

The result is that the formation of the gypsum crystals is clearly assisted by the immediate and almost perfect dispersion of the sulfuric acid in the slurry. It was stated above that this dispersion enables the inopportune precipitates of anhydrite or semi-hydrate to be suppressed and the formation of too large a quantity of nuclei of gypsum crystals to be reduced, while assisting the more regular formation of the gypsum crystals which already exist.

This constitutes a very substantial improvement with respect to existing processes, in the sense that a very regular gypsum crystallization is obtained. Although the usual processes enable gypsum crystals from 1 to 350 microns to be obtained under the best circumstances, the process according to the invention, used with a temperature at the outlet of the dispersion apparatus for the sulfuric acid in the region of about 70° C. enables gypsum crystals to be produced which are all approximately 200 to 350 microns. This result gives a great improvement in the filtration of the slurry.

If the temperature reached by the slurry immediately after dispersion of the sulfuric acid is adjusted to be higher than 70° C., the lowering of this temperature is initiated in order to return it to about 70° C. from the outlet of the apparatus for dispersing the concentrated sulfuric acid in the circulation.

In this way:

(a) There is avoided all formation of crystallized α-semi-hydrate, which would subsequently require a very long time for conversion into gypsum (10 to 36 hours);

(b) All existing gypsum crystals are altered.

The phosphoric acid slurry circuit is thus returned to the physicochemical conditions for the existence of stable gypsum, that is, to the vicinity of 70° C. in the case where there is production of phosphoric acid with production of 30 to 32% of $P_2O_5$. The microscopic precipitate (assumed to be β-semi-hydrate) is transformed very rapidly into gypsum by enlargement of the already existing gypsum crystals in the phosphoric acid slurry, thus making it possible to reach very large dimensions of the gypsum crystals, in the range of 800 to 1000 microns and larger.

This sudden lowering of the temperature can be obtained by different means, used separately or in combination; for example:

(a) By rapid mixing of the slurry with the wash solution returned from the operation of separating the gypsum from the phosphoric acid which is produced, (b) By rapid mixing with a slurry maintained by any suitable means at the temperature of 70° C., for example, by cooling with air or by cooling under vacuum, with formation of a closed circuit on the tank at 70° C. with passage of slurry from this second closed circuit through a cooling arrangement under vacuum, (c) By any other means producing a lowering of temperature, such as blowing in compressed air towards the upper layers of the slurry in the reaction tank.

On completion of the reaction, a quantity of slurry which corresponds to the production of phosphoric acid and gypsum is withdrawn from the circulating slurry and is introduced into a tank which constitutes a supply of slurry in reserve for the operation of separating the gypsum from the phosphoric acid. This separation can be effected either by filtration, screening, centrifuging, or any other method capable of affecting this separation.

Figure 3:
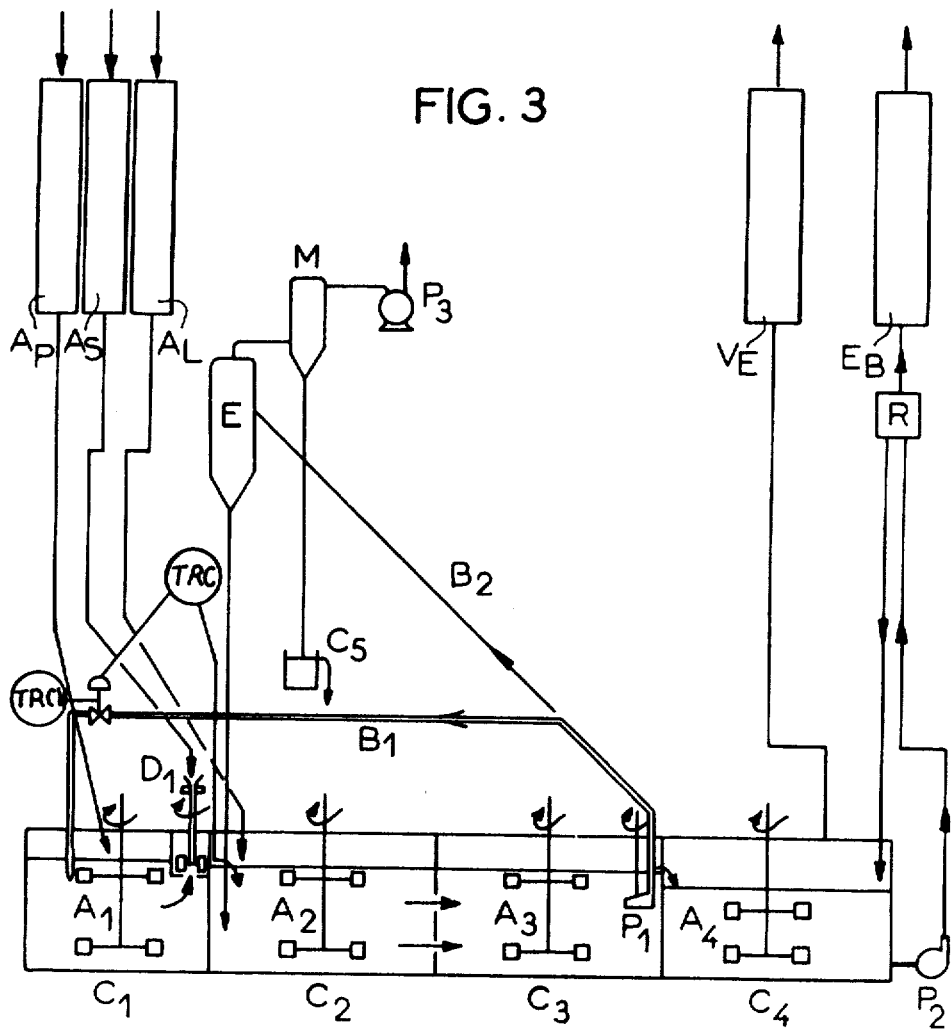
FIG. 3 is an overall diagrammatic view of an installation according to the invention.

The above process can be effected in an installation such as that shown in FIG. 3 of the accompanying drawing.

The installation consists of a series of tanks of which $C_1$ is an initial reaction tank, $C_2$ and $C_3$ are crystallization or ripening tanks, $C_4$ is a slurry reserve tank for the subsequent separation of the gypsum from the phosphoric acid which is produced. The four tanks are respectively provided with agitators $A_1$ to $A_4$. For the supply of weighed phosphate, weighed concentrated sulfuric acid, and a solution resulting from the washing of gypsum separated from the extracted phosphoric acid, respectively, the installation includes three receptacles, $A_p$, $A_s$, and $A_L$. The sulfuric acid is dispersed by means of a dispersion device $D_1$. The slurry is circulated by a pump $P_1$ which returns the slurry from the tank $C_3$ to the initial reaction tank C, through a main pipe $B_1$, a portion of the returned slurry being fed along a secondary pipe $B_2$ to a vacuum cooling device E from whence the cooled slurry is returned to the circuit, the slurry actually being fed to the tank $C_2$. The cooling device is provided with a vacuum pump $P_3$ operating through a condenser M from which condensed water is drained to a tank $C_5$. The temperature of the slurry at the outlet of the dispersion device $D_1$ is sensed and controlled by a device TRC which controls a valve TRCV for regulating the flow through the pipe B. Slurry from the reserve tank $C_4$ is fed by a pump $P_2$ to a discharge device $E_B$ which supplies the paste to a separation device for separating the gypsum from the sulfuric acid, a regulating device R being associated with the pump $P_2$. After separation the gypsum is washed and the resulting solution fed to the wash supply $A_L$. $V_e$ indicates a ventilation device.

The illustrated arrangement is merely by way of example, and is not meant to be limiting, for example, the compartment $C_1$ in which the dispersion of the phosphate slurry and also the reaction of the phosphate with the phosphoric acid is carried out may either precede or follow the device $D_1$ dispersing sulfuric acid in the slurry.

In the limiting case, the dispersing device $D_1$ itself may be used for dispersing the sulfuric acid in the slurry circuit and can also disperse the phosphate in the same slurry circuit. In this case, the compartment $C_1$ is omitted. The vessel containing the dispersing device $D_1$ becomes a vessel with a solid bottom discharging into the compartment $C_2$. The slurry circuit then drops directly into the vessel of the dispersing device $D_1$. The crushed phosphate is also introduced into the vessel of the dispersing device $D_1$, which ensures a vigorous mixing of the phosphate with the slurry circuit. The sulfuric acid is always introduced through the shaft of the dispersing device and distributed centrifugally by blades in the circuit, as will hereinafter be seen.

The mixing of the phosphate in the slurry circuit must be very efficient in order to avoid local excesses of calcium ions, as a result of the basic reactions referred to above, which excesses would cause the formation of a too large number of nuclei of gypsum crystals instead of enlarging the crystals which already exist.

The introduction of sulfuric acid must be carried out in such a way as to obtain a practically perfect and immediate dispersion of the more or less concentrated sulfuric acid in the phosphoric acid slurry.

In the installation as shown in FIG. 3, the concentrated sulfuric acid is dispersed mechanically by means of a special agitator $D_1$ in the slurry. The sulfuric acid passes through the hollow interior of the shaft of the agitator and is conveyed by separate ducts to discharge slots adjacent the stirrer blades. This device ensures a dispersion of the concentrated sulfuric acid by a centrifuging action through substantially horizontal thin slots, the sulfuric acid issuing from the slots in the form of a thin lamina, with a thickness of a few microns, with a very high velocity. The stirrer blades of the dispersing arrangement $D_1$ agitate the slurry. The laminae of sulfuric acid rapidly burst against the walls of the vessel containing the dispersing device $D_1$.

In the installation shown in FIG. 3, the weighed phosphate is introduced into the tank $C_1$ where it is intimately mixed with the flow $B_1$ of the slurry circuit by means of the agitator $A_1$. The phosphoric acid slurry, having reacted with the phosphate, then passes into the device $D_1$ for dispersing more or less concentrated sulfuric acid in the flow of slurry.

At the outlet of $D_1$, the temperature is measured and is transmitted to TRC for controlling and regulating the physicochemical conditions of the reaction. This TRC has previously been given the control temperature to be maintained; according to whether the measured temperature is slightly lower or higher than the control temperature, the TRC will transmit a pulse to the TRCV valve for regulating the circulation of slurry as a function of the temperature, this pulse modifying the rate of flow in the suitable direction for restoring the measured temperature to the value required by control at the TRC device (value determined according to the diagram of FIG. 2).

The phosphoric acid slurry leaving at $D_1$ is thus cooled by being mixed with the washing waters and the mass of slurry contained in $C_2$ and $C_3$.

Agitation is ensured by the agitators $A_2$ and $A_3$. The pump $P_1$ in $C_3$ ensures the two circulations $B_1$ and $B_2$. The secondary closed circulation or circuit $B_2$ ensures the constancy of the temperature of the phosphoric acid slurry contained in $C_2$ and $C_3$ by passing into the vacuum cooling arrangement $E_1$ which causes a temperature drop in $B_2$ which is sufficient to compensate for the supply of heat occurring at $B_1$ at the moment of its introduction into the tank $C_2$. The steam leaving E is condensed in the mixing condenser M. The water of the condenser M is received in the vessel $C_5$ at the base of the barometric column and is discharged to the drainage system. The vacuum necessary for the vacuum vaporization is provided by a vacuum pump $P_3$.

The new phosphoric acid slurry, the overflow of the assembly $C_1$, $C_2$, $C_3$, and E, discharges into $C_4$. The agitation in $C_4$ is maintained by $A_4$. The pump $P_2$ delivers the slurry into R, which regulates the flow of slurry at the value of production towards the installation for separating the produced phosphoric acid from the gypsum. The washing waters of the gypsum are returned towards the reaction assembly $C_1$, $C_2$, $C_3$, E.

A numerical example of the production of phosphoric acid within the scope of the invention is given below:

Morocco phosphate 75 BPL with 34% of $P_2O_5$
Sulfuric acid, 98% $H_2SO_4$
Weight of phosphate per hour which is used, 9.5 kg.
Weight of 98% $H_2SO_4$ per hour which is used, 8.9 kg.
Rate of flow in the circuit of primary slurry $B_1=190$ kg./hour
Discharge temperature from the dispersing arrangement $D_1$ of the sulfuric acid$=88°$ C.

Crystallization temperature of the gypsum in $C_2$, $C_3$=70–72° C.

Slurry temperature in $C_4$=69–70° C.

Phosphoric acid produced=32% $P_2O_5$, 2.5% $H_2SO_4$

Gypsum crystals from 800 to 1000µ in lozenge form (excellent filtration).

Total production of $P_2O_5$=98.5%, of which 0.1% is lost with washing of the gypsum.

Figure 4:
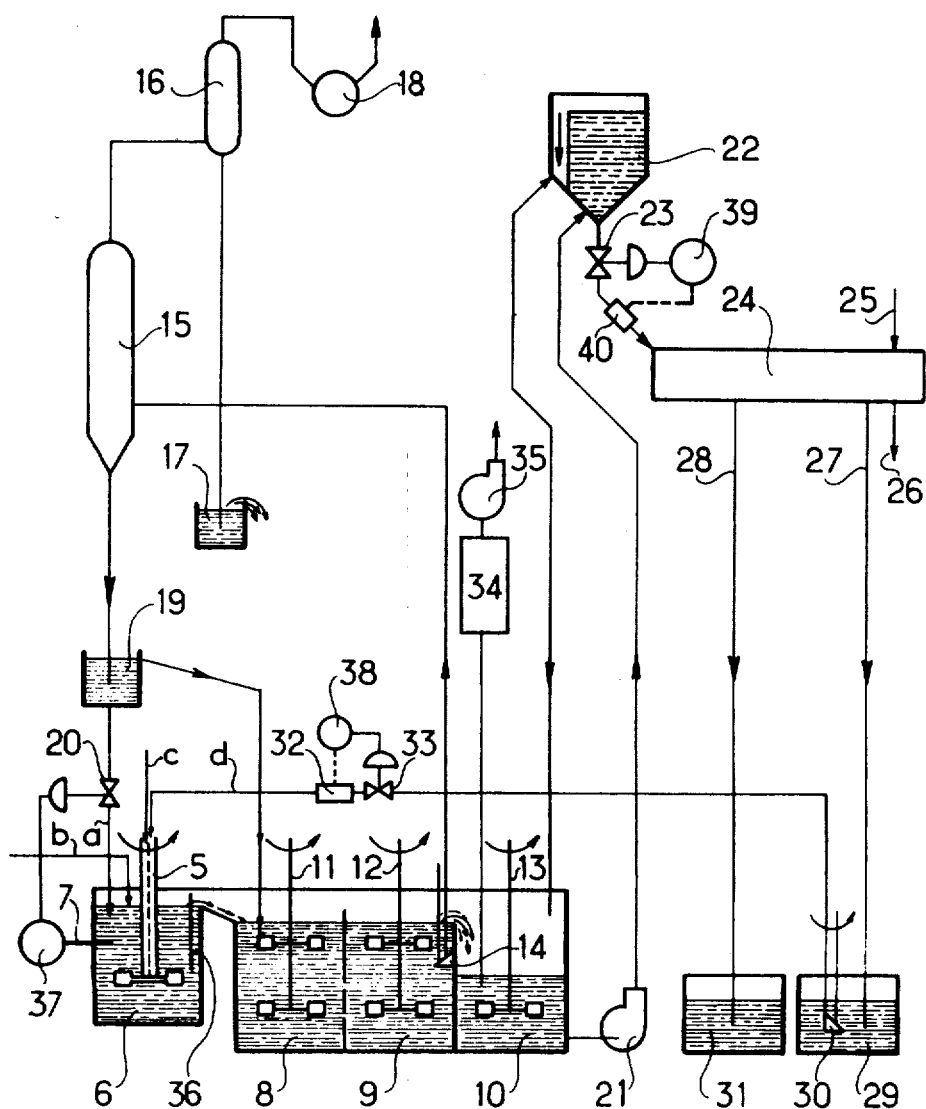
FIG. 4 shows a modification of FIG. 3.

Another example of an installation for carrying out the process according to the invention is shown in FIG. 4; this modified installation is particularly suitable in the case where the phosphate being used is very reactive. It is characterized in that a single tank is provided for introduction of the phosphate, and the dispersion of the concentrated sulfuric acid into the slurry takes place simultaneously with a dispersion of the wash solution of the gypsum cake resulting from separation of gypsum from the produced phosphoric acid, in the slurry.

Preferably, the more or less concentrated sulfuric acid and the washing liquor are dispersed separately in the tank, but through adjacent and narrow orifices of the dispersion apparatus.

The regulation of the temperature inside the tank can be obtained as before by automatic regulation of the rate of flow of the slurry in the closed circuit, but it may also be obtained by automatically controlled introduction of air under pressure into the upper layer of the slurry of the tank.

In FIG. 4, the installation comprises in principle three tanks: A reaction tank 6, where the introduction of the phosphate is made as well as the dispersion of the sulfuric acid and the washing liquor; a stabilizing or "ripening" tank, divided into two compartments 8 and 9; a reserve tank 10 for filtration.

The recirculation of the phosphoric acid slurry is ensured by the pump 14 in the compartment 9. The pump 14 discharges all the slurry returned for recirculation into a vacuum cooling arrangement 15. The vacuum is produced by a vacuum pump 18 and a condenser 16 operating by mixture with cold water. The hot water leaving the condenser is evacuated through a barometric column and a vessel 17 at the bottom of said column into the drainage system. The slurry leaving the vacuum cooling arrangement is divided into two unequal parts after having passed into a vessel 19 at the bottom of the barometric column.

Part of the flow of the slurry serves to standardize the temperature in the reaction tank 6. This rate of flow is automatically regulated by a thermometer 7, which transmits the reading to an automatic temperature regulator 37, which opens or closes the valve regulating the flow of slurry 20, so as to maintain a constant temperature in the reaction tank 6.

The initial reaction is carried out in the tank 6, which receives the temperature regulating slurry flow (reference $a$ in the figure); the Morocco phosphate 82PL, ground until there is 20% of waste on a Tyler 100 screen and weighed (reference $b$); the sulfuric acid (reference $c$) with a strength of 98% or less; the washing liquors of the gypsum cake from the filter (reference $d$).

The liquids $c$ and $d$ are introduced by means of the dispersing and agitating arrangement 5, which runs at high speed (350 r.p.m.).

The agitating and dispersing arrangement 5 is constructed so that the two liquids $c$ and $d$ are brought by means of separate pipes through the shaft and the hub of the stirrer device in the vicinity of the four stirrer blades. These liquids are distributed through thin parallel slots into the mass of slurry which is also given a high velocity by the stirrer blades. There are four groups of two thin slots (a slot for $c$ and a slot for $d$) in the immediate vicinity of the end of each of the four stirrer blades. The position and the shape of the distribution slots must be carefully studied hydraulically in order to ensure the almost perfect dispersion of the liquids $c$ and $d$ in the slurry.

The reason for the simultaneous introduction of the wash solution and sulfuric acid through adjacent parallel slots is to improve further the dispersion of the sulfuric acid, which is in actual fact a fairly viscous liquid. The immediate mixing of the liquids $c$ and $d$ in thin flat laminae at the outlet of the slots is effected at very high speed (12 meters per second). It is easier, because the liquid $d$ is very fluid and does not contain any solid particles, as does the phosphoric acid slurry. The very high speed mixing of the mixture of $c$ and $d$ with the slurry is effected immediately and more easily, because of the high fluidity of the mixture of $c$ and $d$.

FIG. 5 is a partial section showing one embodiment of the combined dispersing and agitating arrangement; the shaft 50 of the agitator is hollow and is divided into two concentric conduits 51 and 52 by the tubular wall 53; at its bottom end, the shaft carries a hollow hub supporting the stirrer blades 60. The hollow hub is formed of two truncated cones having a common base 57 and separated by the latter; the upper truncated cone 54 communicates freely with the conduit 51, and the liquid supplied by said conduit is driven towards the slots 58 by centrifugal force; the lower truncated cone 61 communicates directly with the conduit 52 through the orifice 62; the liquid arriving by way of 52 is driven towards the slots 59 by centrifugal force.

The sulfuric acid may flow either through conduit 51 or conduit 52, the other conduit being used for the wash solution. The shapes of the hub and of the dispersion slots 58 and 59 are such that the jets of liquid are immediately and perfectly mixed at the moment of contact with the phosphoric acid slurry.

The combined agitator and dispersing arrangement 5 of the installation according to FIG. 4 can be equipped with an upper fan or blade so as to ensure, if necessary, a superficial stirring action to obtain a super-wetting of the phosphate. The height of this stirrer arrangement can be regulated.

The reaction tank or vessel 6 is fitted with a chimney 36 in order to avoid any direct flow of the phosphate from the vessel 6 towards the vessel 8.

The temperature control in the vessel 6 can also be obtained by blowing in air under pressure into the upper layer of slurry. In this case, the temperature regulator valve acts directly on the volume of air blown in and the regulating valve 20 is simply a valve acting on the rate of flow of air. In this particular case, it is possible to work without recirculation of slurry originating from the vessel 9.

The reaction is practically completed at the outlet from the vessel or tank 6. The slurry entering the tank or vessel 8 is cooled to the filtration temperature (about 70° C.) by continuous supply of slurry from the vacuum cooling arrangement 15 passing through 19. The cooling of the slurry leaving the tank 6 can also be effected by air being blown into the upper layer of slurry in the tank 8.

The tanks 8, 9 and 10 are equipped with fan-type or screw-type agitators 11, 12, and 13 so as to ensure homogeneity in the tanks.

The new slurry which is produced passes from 9 into the tank 10 before being supplied to the filtration plant 24. The tanks 6, 8, 9 and 10 are kept under a light vacuum so as to ensure cleanliness of the installation. The gases collected in the tanks are scrubbed in a scrubbing chamber 34 and then discharged into the atmosphere by a fan 35. The pump 21 sends the slurry to be filtered into a constant level tank 22, the overflow of which returns to the tank 10.

The flow of the slurry produced is directed in to the filtering plant by the valve 23 and an autoregulating flow meter 39 and 40. The gypsum cake is filtered and washed before being discharged at 26. The wash solution 25 makes it possible to obtain a gypsum cake free of phosphoric acid. The phosphoric acid produced is collected in the tank 31.

The wash solution resulting from the washing of the gypsum cake is collected at 29 and delivered by way of the pump 30 into $d$, the flow meter 32 regulating the flow of the wash solution to the dispersing device 5. The flow meter 32 regulates the flow passing through the valve 33 and the automatic regulating device 38.

Using the above installation with a very reactive Morocco phosphate (83BPL) at the rate of 4 tons per hour, and using 98% sulfuric acid, the following results have been obtained:

Production of phosphoric acid with 32% of $P_2O_5$: 1410 kg. of $P_2O_5$/hour

Yield of $P_2O_5$:

$$\frac{P_2O_5 \text{ acid recovered}}{P_2O_5 \text{ phosphate}} = 98\%$$

Gypsum crystals obtained: 600 microns long, 150 microns wide, this only being an example to show that the size obtained for the gypsum crystals facilitates their separation.

What I claim is:

1. A process for wet method preparation of phosphoric acid in which phosphoric acid is extracted from portions withdrawn, after ripening, from a phosphoric acid slurry circulating in a closed circuit and to which are added natural crushed phosphate and sulfuric acid, characterized in that the sulfuric acid is introduced beneath the surface of the phosphoric acid slurry in the shape of an annular lamina generated by centrifugal projection of said sulfuric acid while the portion of said slurry surrounding the lamina is vigorously agitated to quickly and uniformly disperse said sulfuric acid into said slurry.

2. A process according to claim 1, in which the temperature of the slurry immediately after the dispersion of the sulfuric acid is regulated to about 70° C. in order to obtain the formation of gypsum crystals having a size between 200 and 350 microns.

3. A process according to claim 1, in which the temperature of the slurry immediately after dispersion of the sulfuric acid is regulated to about 2° C. above 70° C. to form a microscopic precipitate whereupon the temperature is lowered to about 70° C. so as to transform this precipitate into gypsum by enlargement of the already existing gypsum crystals in the slurry up to a size of 1000 microns.

4. A process according to claim 1, in which ripened reaction product is washed with water and the resulting washing solution is employed in the process, wherein natural phosphate and sulfuric acid and the washing solution are introduced into the slurry in the same tank, said washing solution also being introduced beneath the surface of said slurry, adjacent to and parallel to the annular lamina generated by centrifugal projection of said sulfuric acid, in the shape of an annular lamina generated by centrifugal projection of said washing solution and wherein the two laminae of sulfuric acid and washing solution are immediately and perfectly mixed at the moment of contact with said slurry.

5. A process according to claim 1, in which the lamina of sulfuric acid bursts against a solid surface whereby increased dispersing efficiency is achieved.

6. A process according to claim 5, in which the solid surface is the adjacent portion of the wall of the slurry containing vessel.

References Cited

UNITED STATES PATENTS

| 3,416,889 | 12/1968 | Caldwell | 23—165 |
| 2,049,032 | 7/1936 | Weber et al. | 23—165 |
| 3,257,168 | 6/1966 | Chelminski | 23—165 |

FOREIGN PATENTS

| 1,335,608 | 8/1963 | France | 23—165 |

OSCAR R. VERTIZ, Primary Examiner

G. A. HELLER, Assistant Examiner

U.S. Cl. X.R.

423—165, 167, 166